Nov. 13, 1934.    F. C. MOCK ET AL    1,980,761
FLOW METER
Filed Sept. 17, 1930

INVENTORS
Frank C. Mock.
Clinton H. Havill.
BY
ATTORNEY

Patented Nov. 13, 1934

1,980,761

UNITED STATES PATENT OFFICE 1,980,761

FLOW METER

Frank C. Mock, East Orange, and Clinton H. Havill, South Orange, N. J., assignors to Bendix Research Corporation, East Orange, N. J., a corporation of Indiana Application September 17, 1930, Serial No. 482,618

12 Claims. (Cl. 73—167)

This invention relates to means for indicating the rate of flow of fluids.

Such indicators are especially applicable for use in conjunction with an internal combustion engine for the purpose of keeping the operator of the engine constantly advised concerning the rate of flow of fuel to the engine; but the present invention is capable of many other uses.

An object of the invention is to provide an indicator of the foregoing character which is adapted to be installed in the fuel line of an internal combustion engine in an airplane or other automotive vehicle, by means of which indicator the operator is provided with a constant check on the performance of the engine from the standpoint of fuel consumption.

Another object of the invention is to provide certain improvements in the construction and method of operation of flow indicators.

A further object is to provide a novel flow indicator of the kind comprising a tubular member and a float member movable longitudinally thereof.

One of the improvements in a flow indicator of the kind just referred to consists of the provision of an externally tapered tubular member as distinguished from the internally tapered member heretofore employed.

Another improvement resides in the provision of a float member of novel construction adapted to cooperate with the aforesaid tubular member in such manner that the maintenance of accurate readings is assured, notwithstanding variations in the temperature of the parts or of the fluid flowing through the device.

Another object of the invention is the provision of a float member and sight member constructed of the same material, thereby assuring uniformity in the accuracy of readings irrespective of temperature variations.

A further object is to provide a float member and sight member of a material which is transparent, practically unbreakable, and susceptible of being machined and otherwise shaped readily and economically.

Another object is the provision of a novel construction of the float member which permits the float member to serve as a means of collecting any foreign substances or sediment which might be in suspension in the fuel and which might otherwise interfere with the accuracy of the readings.

A further object is to provide means for cushioning any sudden rise or fall of the float member, thereby preventing undue shock or injury to the parts.

Other objects and advantages to be derived from the use of the improvements herein disclosed will appear upon an inspection of the following specification with reference to the accompanying drawing. It is to be understood however that the accompanying drawing is illustrative rather than definitive of the invention, in that the invention may be utilized and practiced by the use of constructions varying from the illustration in the drawing. The scope of the invention is therefore to be determined from a reading of the appended claims rather than an inspection of the drawing now to be described for the purpose of explaining what is now considered to be the preferred embodiment of the invention.

Figure 1:
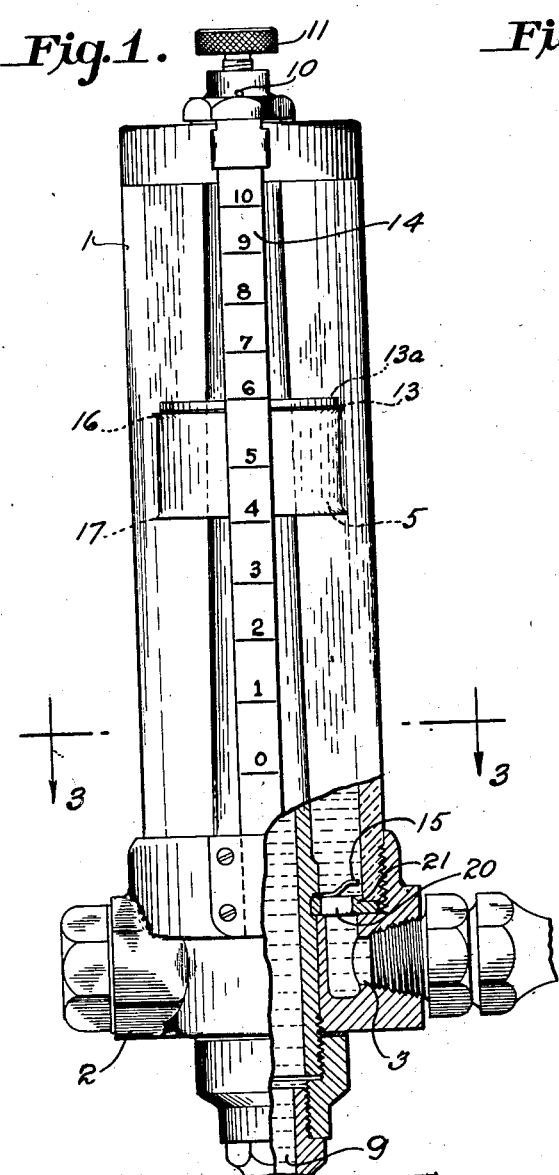
Fig. 1 is a view in elevation, with parts broken away and sectioned, of an indicator mechanism embodying the present invention.
Figure 2:
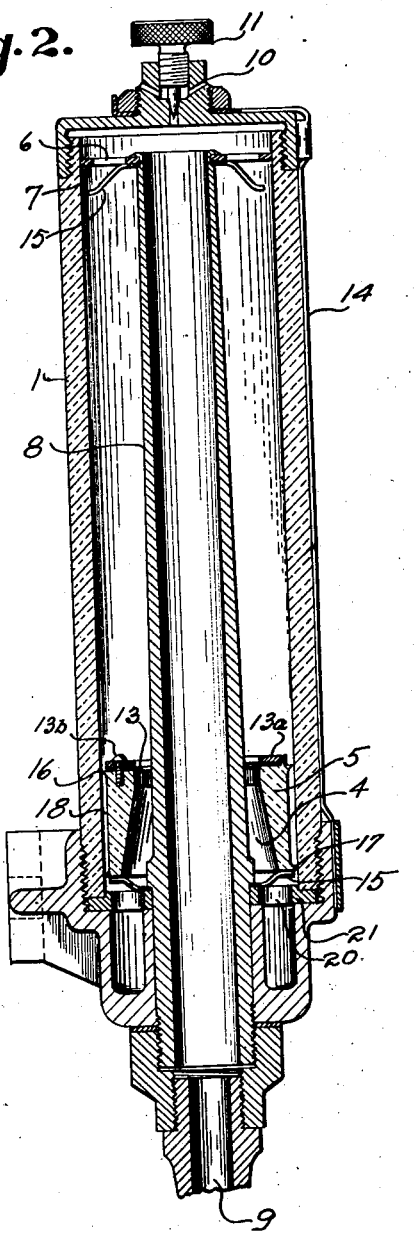
Fig. 2 is a sectional elevation view taken at right angles to the view point in Fig. 1 and showing the float member in the position corresponding to zero indication.
Figure 3:
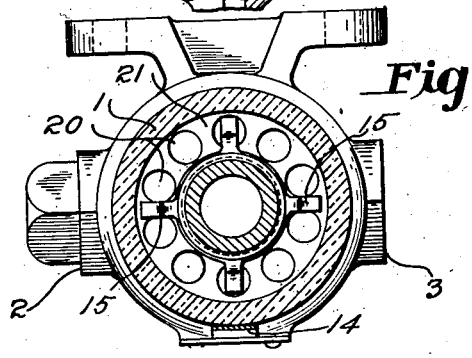
Fig. 3 is a transverse sectional view taken along the line 3—3 of Fig. 1.

In the drawing the reference character 1 designates a cylindrical casing serving as the container for the gasoline or other fuel, the rate of flow of which is to be measured. The fluid is adapted to be admitted to the container 1 through either of the inlet passages indicated at 2 and 3. From the point of admission the fuel may pass upwardly through openings 20 in baffle plate 21, thence through the tapering central aperture 4 in float member 5, thence upwardly through the openings 6 in the plate 7, the fuel returning through the tubular member 8 to the outlet passage 9 leading to the engine. The container 1 is intended to be completely filled with the fuel at all times, a vent to permit escape of any air which may accumulate being provided as indicated at 10. This vent is normally closed by the provision of suitable means as shown in 11.

It will be noted that the tubular member 8 is tapered along its external surface, the degree of tapering being such as to permit a more or less uniformly increasing cross sectional area for the passage of fuel as the increase in the rate of flow causes a pressure against the under surface of the float member 5 which results in an upward movement thereof, upward movement continuing until a balanced pressure condition is attained.

The cross sectional area of the passageway for the fuel is controlled by the degree of taper of the member 8 and also by the size of the annular opening between the metering disc or member 13 and the member 8, the member 13 being fixed in position on float 5 by suitable means such as the ring 13a and screws 13b. In this connection a novel feature is the employment of the same material in the construction of the disc 13 and the member 8 which material may be metal. As a result the expansion and contraction of the disc 13 and of the member 8 are such as to neutralize one another, thereby preventing any variation in the accuracy of the readings.

An important feature is the fact that uniform distribution of the flow around the circumference of the member 8 is assured by the spacing of the openings 20 in plate 21.

The readings are obtained by providing a suitable scale 14 extending along the surface of the container 1, the degree of taper of the member 8 with respect to the size and weight of the float member 5 being such as to permit the placing of the scale markings at suitable intervals along the scale 14. The scale provides direct indication of the rate of fuel consumption at any instant, either in pounds per hour or other units.

In order to obtain a float member which will respond properly to variations in the rate of flow of the fuel, it is desirable to construct the float of a material which will give the float member a weight substantially twice the weight of a similar volume of the fuel, and at the same time restrict the cross sectional area of the free passageway for the fuel. It will also be appreciated that for the construction of the container 1 a transparent substance must be employed so as to permit sight of the float 5 and comparison of the position of the float with the markings of the scale 14. Because of the foregoing considerations it has heretofore been customary to construct the float member of one material best suited for the peculiar needs of that member, and to construct the sight member of a different material, best suited for the particular function of that member. It has now been discovered that a composite substance of a character commonly termed synthetic resin, is admirably adapted for use as the material for the construction of both the float 5 and the sight member 1, this material being practically unbreakable, of the proper weight and workability as well as being sufficiently transparent to permit sight of the float member 5. Moreover the use of the same material for both float and casing has the same effect as the use of the same material for disc 13 and tubular member 8, to wit; insurance of uniform accuracy notwithstanding temperature variations.

The material above suggested has the further advantage that it is not injuriously affected by gasoline or any similar liquid.

Means are preferably provided to retard and cushion any sudden rise or fall of the float 5 and prevent sudden engagement between the float and its upper or lower limits of movement. As shown, such means consists of a plurality of resilient fingers 15 secured at their inner ends but adapted to yield at their outer ends upon being struck by the upward or downward movement, as the case may be, of the float 5.

Attention is directed to another feature in the construction of the float 5, namely, the provision of the flared edges 16 and 17 engaging the inner surface of the container 1 and together forming a pocket 18 around the circumference of the float. These edges 16 and 17 therefore serve not only as a means for assisting the operator of the engine in reading the exact position of the float against the scale 14, but also serve as guide members for the float.

There is thus provided a novel flowmeter which is inexpensive to manufacture and which may be quickly installed. By providing the return for the liquid through the tapered tube all connections to the flowmeter are made adjacent the bottom thereof thus facilitating installation and conserving space on the instrument panel.

Though there has been illustrated and described only one embodiment of the invention, it is to be understood that the same is not limited to the form shown but may be embodied in various forms.

Various other changes, which will now appear to those skilled to the art, may be made in the form, details of construction, and arrangement of the parts, without departing from the scope of the invention; and reference is therefore to be had to the appended claims for a definition of the limits of the invention.

What is claimed is:

1. An instantaneous flow indicator comprising an upright cylindrical container, an externally tapered tube mounted coaxially within said container, a float surrounding said tube, means forming an inlet passage below said float and outside said tube, and means forming an outlet passage connecting with said tube.

2. An indicator comprising an upright cylindrical container, an externally tapered tubular member mounted coaxially within said container, a float surrounding said tubular member, means for directing a flow of fluid through said float and into the upper end of said tubular member, and means for withdrawing said fluid at the lower end of said tubular member.

3. An instantaneous flow indicator comprising an upright cylindrical container, a tapered tube mounted coaxially within said container, said tube having a wall constructed of a metallic substance, a non-metallic float surrounding said tube, and means for controlling the flow between said float and tube comprising a metering member secured to the float constructed of the same material as said tube, said metering member being secured to the float in spaced relation to the container side wall.

4. In a device of the class described, an upright container, a tube mounted coaxially within said container, said tube having a tapered wall constructed of a metallic substance, a float surrounding said tube, and means for controlling the flow between said float and tube comprising a metering member movable with the float and constructed of a material having the same coefficient of expansion as the material composing the wall of said tube.

5. An instantaneous flow indicator comprising an upright cylindrical container, an axially extending tapered tube therein, an annular float longitudinally movable within said container and surrounding said tube, said float having its upper and lower edges flared to engage the inner surface of said container, and means directing liquid to flow upwardly in said container.

6. A flow indicator comprising a transparent closed upright container, an axially extending tapered tube forming an open ended standpipe therein, means forming a tube outlet, an annular float, said float having a portion guided in the container of the same thermal coefficient expansion as the container, said float having another portion having a central opening surrounding the tube, said second portion having the same thermal coefficient of expansion as the tube, and means forming a fluid inlet to the container below the float.

7. A flow indicator comprising a transparent closed upright container, an axially extending tapered tube forming an open ended standpipe therein, means forming a tube outlet, an annular float, said float having a portion guided in the container of the same thermal coefficient expansion as the container, said float having another portion having a central opening surrounding the tube, said second portion having the same thermal coefficient of expansion as the tube, means forming a fluid inlet to the container below the float, and a baffle in the inlet for distributing fluid equally around the periphery of the container.

8. A flow indicator comprising a transparent closed upright container, an axially extending tapered tube forming an open ended standpipe therein, means forming a tube outlet, an annular movable member surrounding the tube, means forming a fluid inlet at the bottom of the container, and means for eliminating trapped gases from the container.

9. In a flow meter, an upright cylindrical container having a wall constructed of a transparent substance, a float of substantially the same diameter as the interior of the container and slidably arranged therein, said float having a wall constructed of the same substance as the container, said container having an inlet and an outlet, said float being adapted to be moved vertically in response to flow through the container, a tapered central member in said container about which said float is slidable, a scale secured to a fixed part of the flow meter and said float having an end portion adapted to act as an indicator with respect to the scale.

10. In a flow meter, an upright cylindrical container having a wall constructed of a transparent substance, a float of substantially the same diameter as the interior of the container slidably arranged therein to be guided thereby, said float having a wall constructed of a substance having the same thermal coefficient of expansion as of said transparent substance, said container having an inlet and an outlet, said float being adapted to be moved vertically in response to flow through the container, a tapered central member in said container about which said float is slidable, a scale secured to a fixed part of the flow meter and said float having an end portion adapted to act as an indicator with respect to the scale.

11. In a flow meter, an upright container, an annular float, a vertical tapered metering member upon which the float slides, said float having peripheral portions conforming to the contour of the container and having substantially no clearance therebetween, said container having an inlet and an outlet arranged on opposite sides of the float, said container and said float being constructed of a material having the same thermal coefficient of expansion, and a plate secured to the float having an orifice surrounding the tapered member, said plate having the same thermal coefficient of expansion as the member and having its periphery spaced from the container side wall.

12. In a device of the class described, an upright container, a tube mounted coaxially within said container, said tube having a tapered wall constructed of a metallic substance, a float surrounding said tube, and means for controlling the flow between said float and tube comprising a metering member movable with the float and constructed of a material having the same coefficient of expansion as the material composing the wall of said tube, said metering member being secured to the float in spaced relation to the container side wall.

FRANK C. MOCK.
CLINTON H. HAVILL.